US012000055B2

(12) United States Patent
Ahmad et al.

(10) Patent No.: US 12,000,055 B2
(45) Date of Patent: Jun. 4, 2024

(54) ELECTROCHEMICAL CONVERSION OF A CARBON MATERIAL TO GRAPHENE

(71) Applicant: PETROLIAM NASIONAL BERHAD (PETRONAS), Kuala Lumpur (MY)

(72) Inventors: Norariza Ahmad, Kuala Lumpur (MY); Zulkifli Ahamid, Kuala Lumpur (MY); Muzdalifah Zakaria, Kuala Lumpur (MY); Mark Bissett, Manchester (GB); Ian Kinloch, Manchester (GB)

(73) Assignee: PETROLIAM NASIONAL BERHAD (PETRONAS), Kuala Lumpur (MY)

(*) Notice: Subject to any disclaimer, the term of this patent is extended or adjusted under 35 U.S.C. 154(b) by 0 days.

(21) Appl. No.: 18/021,906

(22) PCT Filed: Jul. 29, 2021

(86) PCT No.: PCT/MY2021/050063
§ 371 (c)(1),
(2) Date: Feb. 17, 2023

(87) PCT Pub. No.: WO2022/039589
PCT Pub. Date: Feb. 24, 2022

(65) Prior Publication Data
US 2024/0003018 A1 Jan. 4, 2024

(30) Foreign Application Priority Data

Aug. 17, 2020 (MY) .............. PI2020004227

(51) Int. Cl.
C25B 1/135 (2021.01)
C01B 32/184 (2017.01)
(Continued)

(52) U.S. Cl.
CPC ............ *C25B 1/135* (2021.01); *C01B 32/184* (2017.08); *C25B 1/50* (2021.01); *C25B 11/043* (2021.01); *C25B 11/061* (2021.01)

(58) Field of Classification Search
None
See application file for complete search history.

(56) References Cited

U.S. PATENT DOCUMENTS 10,081,550 B2   9/2018   Zhamu et al.
2016/0168726 A1  6/2016   Dryfe et al.

FOREIGN PATENT DOCUMENTS

CN      103510103 A    1/2014
NO      2017141044 A1  8/2017

OTHER PUBLICATIONS

International Search Report and Written Opinion for Corresponding Application No. PCT/MY2021/050063 (mailed Dec. 1, 2021).

(Continued)

*Primary Examiner* — Wojciech Haske
(74) *Attorney, Agent, or Firm* — Troutman Pepper Hamilton Sanders LLP

(57) ABSTRACT

Disclosed herein is a method of converting a carbon material to graphene, the method comprising the step of subjecting an amorphous carbon material pellet submerged in a molten inorganic material that comprises an alkaline earth halide to an electrochemical reaction in an inert atmosphere for a period of time, wherein the amorphous carbon material pellet is converted to a graphene pellet comprising graphene flakes by said reaction.

20 Claims, 6 Drawing Sheets

(51) Int. Cl.
    C25B 1/50      (2021.01)
    C25B 11/043    (2021.01)
    C25B 11/061    (2021.01)

(56)              References Cited

OTHER PUBLICATIONS

Kamali et al., "Large-Scale Preparation of Graphene by High Temperature Insertion of Hydrogen into Graphite," Nanoscale 7:11310-11320 (2015).
Jin et al., "Electrochemical Graphitization: An Efficient Conversion of Amorphous Carbons to Nanostructured Graphites," Chem. A Euro. J. 23:11455-11459 (2017).
Peng et al., "Electrochemically Driven Transformation of Amorphous Carbons to Crystalline Graphite Nanoflakes: A Facile and Mild Graphitization Method," Angew. Chem. Int. Ed. 56:1751-1755 (2017).
Itu et al., "High-efficiency Transformation of Amorphous Carbon Into Graphite Nanoflakes for Stable Aluminum-ion Battery Cathodes," Nanoscale 11:12537-12546 (2019).
Sierra et al., "Cokes of Different Origin as Precursors of Graphene Oxide," Fuel 166:400-403 (2016).
Examination Report for Malaysian Application No. PI2020004227, dated Oct. 27, 2022.
Search Report for Malaysian Application No. PI2020004227, dated Oct. 27, 2022.

ELECTROCHEMICAL CONVERSION OF A CARBON MATERIAL TO GRAPHENE

This application is a national stage application under 35 U.S.C. § 371 of International Application No. PCT/MY2021/050063, filed Jul. 29, 2021, which claims the priority benefit of Malaysia Provisional Patent Application Serial No. PI2020004227, filed Aug. 17, 2020.

FIELD OF INVENTION

The current invention relates to an electrochemical method of converting a carbon material to graphene.

BACKGROUND

The listing or discussion of an apparently prior-published document in this specification should not necessarily be taken as an acknowledgement that the document is part of the state of the art or is common general knowledge.

Petroleum coke is a carbon-rich by-product that is derived from petroleum refinery from crude oil processing. Typically, petroleum coke is produced in a refinery at approximately 500 kilo-metric ton per year, which can be sold at approximately USD80 per ton. Given its high carbon content, petroleum coke is typically used in the production of electrodes used as carbon anodes for the aluminium industry, as fuel in the firing of solid fuel boilers used to generate electricity, and as a fuel for cement kilns.

As petroleum coke is made of disordered carbon comprise of both sp3 and sp2 bonding, including disordered sp2 layers (that is, carbon in a less graphitised form), this makes it difficult for it to be directly converted to graphitic materials. Typically, the conversion of petroleum coke to graphite requires the use of very high temperature of more than 2500° C. to achieve graphitisation. Efforts have also been made to use metal-based catalysts to reduce the graphitisation temperature. However, this is impractical as it usually generates turbostratic carbon and/or onion-like carbon with large amounts of encapsulated catalysts that are difficult to remove.

Graphene is an allotrope of carbon having a monolayer of $sp^2$ carbon atoms, tightly bound in a hexagonal honeycomb lattice. Graphene has a high surface area and is known for its superior thermal, mechanical, electrical and optical properties. It can be used in various areas of oil and gas applications, such as polymer composite structures, coatings, and as an additive for downstream products such as fuels and lubricants. Given its multi-functionality, graphene is often regarded as a high-value carbon material.

Given the above, there remains a need to develop new methods to convert low-value carbon material (such as petroleum coke) into high-value carbon materials (i.e. graphene or related similar structures). More importantly, these methods need to be able to produce the desired carbon material with high quality and at a high yield. In addition, the method should not involve or produce harmful substances, have a minimal energy consumption and can be scaled up easily.

SUMMARY OF INVENTION

Aspects and embodiments of the invention are described in the following clauses.

1. A method of converting a carbon material to graphene, the method comprising the step of subjecting an amorphous carbon material pellet submerged in a molten inorganic material that comprises an alkaline earth halide to an electrochemical reaction in an inert atmosphere for a period of time, wherein the amorphous carbon material pellet is converted to a graphene pellet comprising graphene flakes by said reaction.

2. The method according to claim 1, wherein the pellet is broken up to provide individual and/or aggregates of graphene flakes.

3. The method according to claim 2, wherein the graphene flakes display one or more of the following properties:
  (a) at least 70% of the graphene flakes have a thickness of five layers of less;
  (b) the thickness of the graphene flakes is from 0.3 to 3 nm;
  (c) the lateral size of the graphene flakes is from 500 to 1000 nm.

4. The method according to any one of the preceding claims wherein the molten inorganic material is maintained in a molten state at a temperature of from 700 to 900° C.

5. The method according to claim 4, wherein the molten inorganic material is maintained in a molten state at a temperature of 850° C.

6. The method according to any one of the preceding claims, wherein the alkaline earth has formula I:

$$MX_2 \qquad \qquad I$$

where M is selected from Ca, Mg and Ba; and
X is selected from Cl or Br.

7. The method according to claim 6, wherein the alkaline earth halide is $CaCl_2$).

8. The method according to any one of the preceding claims, wherein the molten inorganic material consists essentially of an alkaline earth halide.

9. The method according to any one of claims 1 to 7, wherein the molten inorganic material further comprises an alkali halide of formula II:

$$NX \qquad \qquad II$$

where N is K, Na or Li; and
X is Cl or Br.

10. The method according to claim 9, wherein, when present, the molar ratio of the alkali halide to the alkaline earth halide is from 0.1:1 to 1:0.1, such as 1:1.

11. The method according to any one of the preceding claims, wherein the electrochemical reaction is conducted using a voltage of from 2.2 to 3.0 V, such as 2.6 V.

12. The method according to any one of the preceding claims, wherein the period of time is from 60 to 120 minutes, such as 90 minutes.

13. The method according to any one of the preceding claims, wherein the amorphous carbon is selected from one or more of the group consisting of biomass, coal, activated carbon, coke, and carbon black.

14. The method according to claim 13, wherein the amorphous carbon is petroleum coke.

15. The method according to any one of the preceding claims, wherein the amorphous carbon is provided as a pellet formed by the compression of amorphous carbon particles having an average particle size of from 50 to 100 µm in size.

16. The method according to any one of the preceding claims, wherein the inert atmosphere is argon.

17. The method according to any one of the preceding claims, wherein the amorphous carbon forms a cathode used in the electrochemical reaction.

18. The method according to claim 17, wherein the cathode is attached to a current collector, optionally wherein the current collector is formed from one or more of a molybdenum mesh, a molybdenum wire and a nickel foam.

19. The method according to claim 17 or claim 18, where an anode is provided as a counter electrode to the cathode.

20. The method according to claim 19, wherein the anode is formed from graphite.

DRAWINGS

FIG. 1 Depicts a schematic diagram representing the process to convert raw petroleum coke 10 to graphene 60.

FIG. 2 Depicts the layout of the electrolytic cell 40: (a) detailed setup of the electrolytic cell 40; and (b) a photograph of the outer view of the cell 40.

DESCRIPTION

Figure 1:
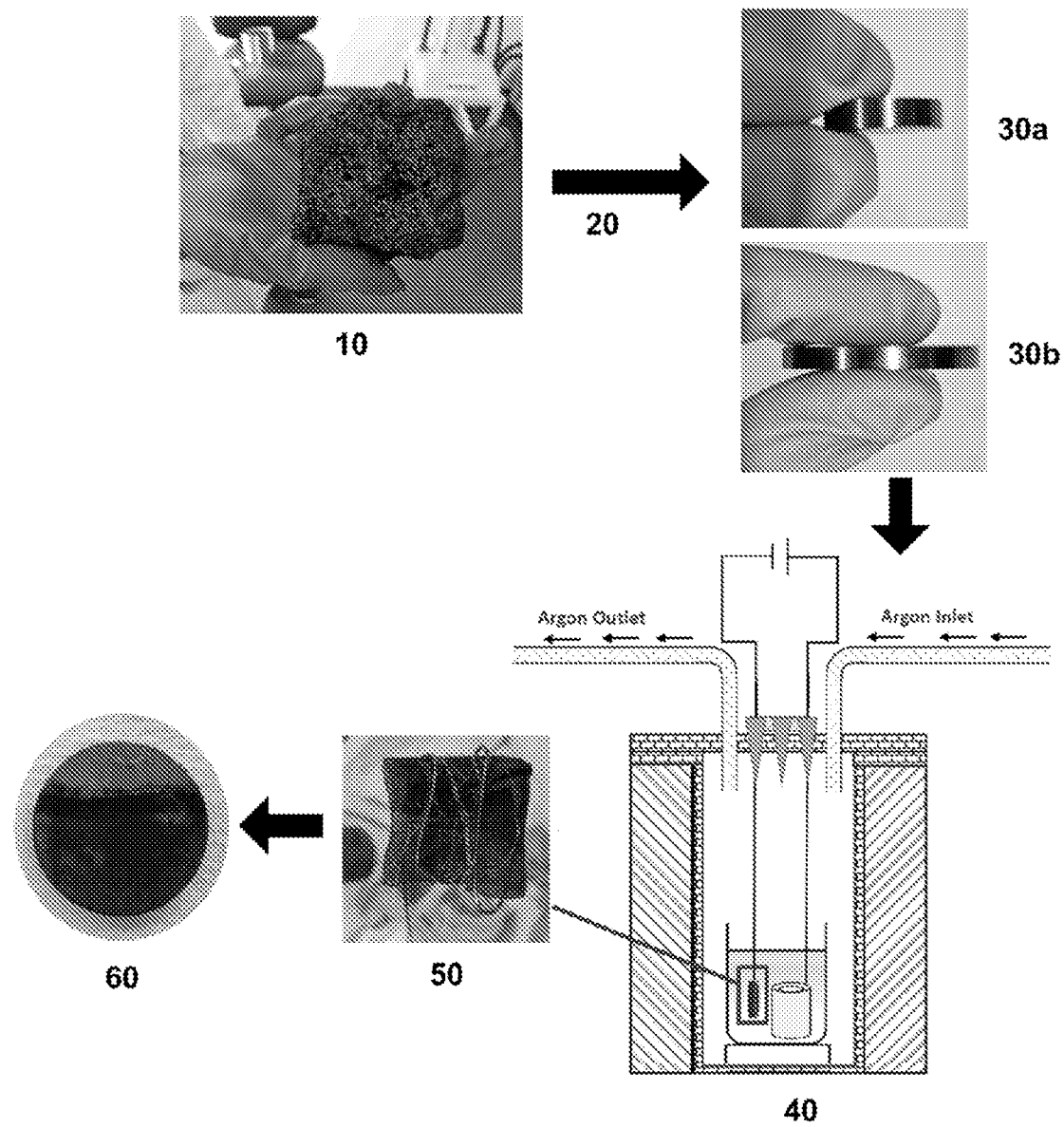

The method described herein surprisingly results in the formation of graphene flakes in good yield (e.g. more than 70%) from an amorphous carbon source, while conducted at relatively low temperatures compared with other techniques. This reduces the overall cost of the conversion and it also makes the process more energy-efficient. In addition, the process does not involve toxic chemicals (e.g. organic solvents etc), and may also reduce waste or side products, resulting in a process with an environmental impact that is significantly less than conventional processes that aim to achieve the same effect.

Thus, in a first aspect of the invention, there is disclosed a method of converting a carbon material to graphene, the method comprising the step of subjecting an amorphous carbon material pellet submerged in a molten inorganic material that comprises an alkaline earth halide to an electrochemical reaction in an inert atmosphere for a period of time, wherein the amorphous carbon material pellet is converted to a graphene pellet comprising graphene flakes by said reaction.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

When used herein, the term "amorphous carbon" is intended to refer to a solid form of carbon whose powder pattern contains no crystalline diffraction peaks or, if such peaks are present, form a minor component. In other words, the amorphous carbon may be formed from unstructured carbon layers, where the weight percentage of an amorphous fraction of the material may be from 90 to 100 wt % of the material and the weight percentage of a crystalline fraction may be from 0 to 10 wt % of the material. For example, the weight percentage of a crystalline fraction may be less than 10 wt % of the material (e.g. less than 5 wt %, such as less than 2 wt %, such as less than 1 wt %).

Any suitable material may be used as the amorphous carbon. Example of suitable materials include, but are not limited to biomass, coal, activated carbon, coke, and carbon black (e.g. coke and carbon black). In particular embodiments of the invention that may be mentioned herein the amorphous carbon may be petroleum coke. Examples of petroleum coke grades include, but are not limited to, needle coke, honeycomb coke, sponge coke and shot coke. In particular embodiments of the invention that may be mentioned herein, the petroleum coke may be sponge coke.

As will be appreciated, the pellet of amorphous carbon is converted in the process to a pellet formed by a plurality of graphene flakes. This pellet may then be broken up by any suitable means, such as grinding (e.g. mortar and pestle), ball milling or other form of pulverisation (whether mechanical or manual) to provide the desired graphene flakes. The resulting graphene flakes may be presented in the form of individual graphene flakes and/or aggregates of graphene flakes. As will be appreciated, aggregates of graphene flakes contain graphene sheets that are not stacked together in an orderly structure. That is, the aggregates contain randomly distributed and positioned graphene flakes. For example, some flakes may be crumpled, creased, folded, rippled etc. and some flakes may be perpendicular to others in the aggregate. In other words, there is no order to the structure of the aggregate and there is no consistent interlayer spacing. In contrast, graphite is formed from many layers of graphene stacked together with a fixed interlayer spacing and so is has an ordered structure. Functionally, therefore, the aggregates discussed herein can be more easily broken up into the constituent individual graphene flakes as compared to graphite (i.e. less energy is needed because the aggregate does not have an ordered structure).

Thus, when used herein, the term "aggregates of graphene flakes" refers to graphene sheets/flakes that do not contain a consistent, ordered structure between the graphene sheets/flakes The graphene flakes produced in the process may display one or more of the following properties:
 (a) at least 70% of the graphene flakes have a thickness of five layers of less;
 (b) the thickness of the graphene flakes is from 0.3 to 3 nm; and
 (c) the lateral size of the graphene flakes is from 500 to 1000 nm.

Details of how each of these parameters are measured are discussed in the experimental section (i.e. Example 2) below.

As noted above, the amorphous carbon pellet is submerged in a molten inorganic material that comprises an alkaline earth halide. The inorganic material is maintained in a molten state during the process and may be maintained at a temperature of from 500 to 1,500° C. For example, the molten inorganic material may be maintained at a temperature of from 700 to 900° C., such as 850° C.

As noted above, the molten inorganic material includes an alkaline earth halide, which should alone, or in combination with other inorganic materials, be capable of maintaining a molten state within the temperature ranges discussed hereinbefore. In embodiments of the invention that may be mentioned herein, the alkaline earth has formula I:

$$MX_2 \qquad \qquad I$$

where M may be selected from Ca, Mg and Ba; and
X may be selected from Cl or Br.

As will be appreciated, a single alkaline earth halide may be used in the inorganic material or two or more alkaline earth halides may be used as a mixture. Said alkaline earth halides may each be an alkaline earth halide that falls within the definition of formula I above. An example of a suitable alkaline earth halide that may be mentioned in embodiments of the invention disclosed herein is $CaCl_2$.

In certain embodiments of the invention, the molten inorganic material may consist essentially of an alkaline earth halide, though this does not exclude the possibility of two or more alkaline earth halides being used. In such embodiments, the alkaline earth halide may from at least 90 wt %, such as at least 95 wt %, such as at least 99 wt %, such as at least 99.9 wt %, such as at least 99.9999 wt % of the molten inorganic material. With the balance being formed from impurities that may be present in the alkaline earth halide(s) used.

In certain embodiments of the invention, the molten inorganic material may further comprise an alkali halide of formula II:

$$NX \qquad \qquad II$$

where N is K, Na or Li; and
X is Cl or Br.

As will be appreciated, a single alkali halide may be present in the inorganic material or two or more alkali halides may be used as a mixture. Said alkali halides may each be an alkali halide that falls within the definition of formula II above. Examples of suitable alkali halides that may be mentioned in embodiments of the invention disclosed herein are NaCl and LiCl.

When present, the molar ratio of the alkali halide to the alkaline earth halide in the inorganic material may be from 0.1:1 to 1:0.1, such as 1:1.

As will be appreciated, the process described herein is an electrochemical reaction. Any suitable voltage that can convert amorphous carbon to graphene may be used under the other conditions specified, which can be readily determined by a skilled person. Examples of suitable voltages that may be used include, but are not limited to, a voltage of from 2.2 to 3.0 V, such as 2.6 V.

Any suitable period of time may be used in which to conduct the electrochemical reaction, provided that it is sufficient to ensure consumption of the starting amorphous carbon material. Suitable periods of time for the electrochemical reaction that may be mentioned herein include, but are not limited to, a period of from 60 to 120 minutes, such as 90 minutes.

As noted above, the amorphous carbon is provided as a pellet. This the amorphous carbon pellet may be formed by the compression of amorphous carbon particles having an average particle size of from 50 to 100 μm in size.

Any suitable inert gas that does not take part in, or interfere with, the electrochemical reaction may be used in the process described herein to provide the inert atmosphere. For example, the inert gas used to provide the inert atmosphere may be argon.

As will be appreciated, as this method described herein is an electrochemical reaction, a cathode and anode will form part of the reaction set-up. In embodiments of the invention, the amorphous carbon pellet may form a cathode that is used in the electrochemical reaction. The amorphous carbon material may then be surrounded by a current collector, which may be formed by one or more of a molybdenum mesh, a molybdenum wire and a nickel foam. For example, the current collector may be formed by a molybdenum mesh that surrounds the amorphous carbon pellet and a molybdenum wire that is connected to the molybdenum mesh. Any suitable material that is inert to the reaction conditions (e.g. graphite) may be used as the anode.

Further aspects and embodiments of the invention will now be described by reference to the following non-limiting examples.

EXAMPLES

Materials

The petroleum coke was obtained from a refinery in Malaysia (e.g. Malaysian Refining Company Sdn Bhd (MRCSB)). $CaCl_2$ (purity of >97%, anhydrous) was purchased from Sigma Aldrich. Molybdenum wires (1 mm diameter, 99.95% purity) were purchased from Advent Research Material, England. Molybdenum wires (100 mesh, 99.9%) were purchased from Hebei Haocheng Metal Wire Mesh Co. Ltd, China. Graphite Crucibles (99.9% purity) were purchased from Qingdao Yunpeng Graphite Products Co., Ltd, China. Alumina crucibles (high alumina 99.5-99.7%) were purchased from Zhengzhou Mission Ceramic Products Co., Ltd, China.

General Method

Raman Spectroscopy

Raman spectra were recorded from 750 to 3500 $cm^{-1}$ on a Renishaw Centrus 0MCN37 (Renishaw Instruments, England) using a 514.5 nm argon ion laser and grating of 2400 l/mm (vis).

Transmission Electron Microscopy (TEM)

Transmission electron microscopy with selected-area electron diffraction (SAED) was conducted using Thermo Fischer Tecnai F30.

X-Ray Diffraction (XRD)

X-ray powder diffraction analysis was performed using X'Pert, Panalytical diffractometer at scan rate of 0.01°/s, slit width of 0.1 mm using CuKα line (λ=1.540598 Å) as radiation source.

CHNS Elemental Analysis

The C, H, N, and S content analysis of starting materials and synthesised coke-based product were carried out using Elementar vario Micro cube. The analyses were performed using 2 mg of ground sample.

X-Ray Photoelectron Spectroscopy (XPS)

XPS analysis was performed using Thermo Scientific K Alpha with a monochromated aluminum X-ray source at the power of 72 W. Avantage software was used to perform curve fitting, deconvolution and calculation of the atomic ratios. The binding energy profiles were deconvoluted as follows: $sp^2$-hybridized carbon (284.5 eV), $sp^3$-hybridized carbon (285.5 eV), C—O groups (286.5 eV), C═O groups (287.7 eV) and COOH groups (288.7 eV).

General Method 1—Pre-Treatment and Preparation of Raw Petroleum Coke Pellet (Step 20 in FIG. 1)

The as-received petroleum coke 10 was ground and sieved to obtain particles having size between 50 to 100 μm. The sieved petroleum coke particles (0.5 g) were weighed and die-pressed at 10 tons force for 10 minutes using the combination of 13 mm pellet dies and hydraulic press equipment to form the coke pellet. The dimension of the obtained coke pellet is 13 mm in diameter with ~3 mm thickness. As will be appreciated, a coke pellet of different size may be prepared. For example, a coke pellet 30b with a weight of 3.5 g, diameter of 32 mm and thickness of 3.60 mm was prepared.

The as-prepared petroleum coke pellet was then wrapped with a porous molybdenum mesh (or a molybdenum gauze) and molybdenum wire, to form the electrode 50 for use with an electrolytic cell. The molybdenum mesh and wire serve as current collector for the cathode. The wrapped coke electrode 50 can be attached to a stainless steel rod that will be later used as the cathode electrode.

Example 1. Electrochemical Conversion of Petroleum Coke to Graphene

The process of converting petroleum coke to graphene is depicted in FIG. 1 in which a petroleum coke 10 was first processed (via step 20 which involves grinding, sieving and die-pressing) into a pellet (30a and 30b). The pellet was further wrapped with current collectors like molybdenum mesh and wire to form an electrode 50 for use in an electrolytic cell 40. The method of the current invention converts the petroleum coke pellet (30a and 30b) into a graphene pellet 60 as discussed in detail below.

Experimental

Figure 2:
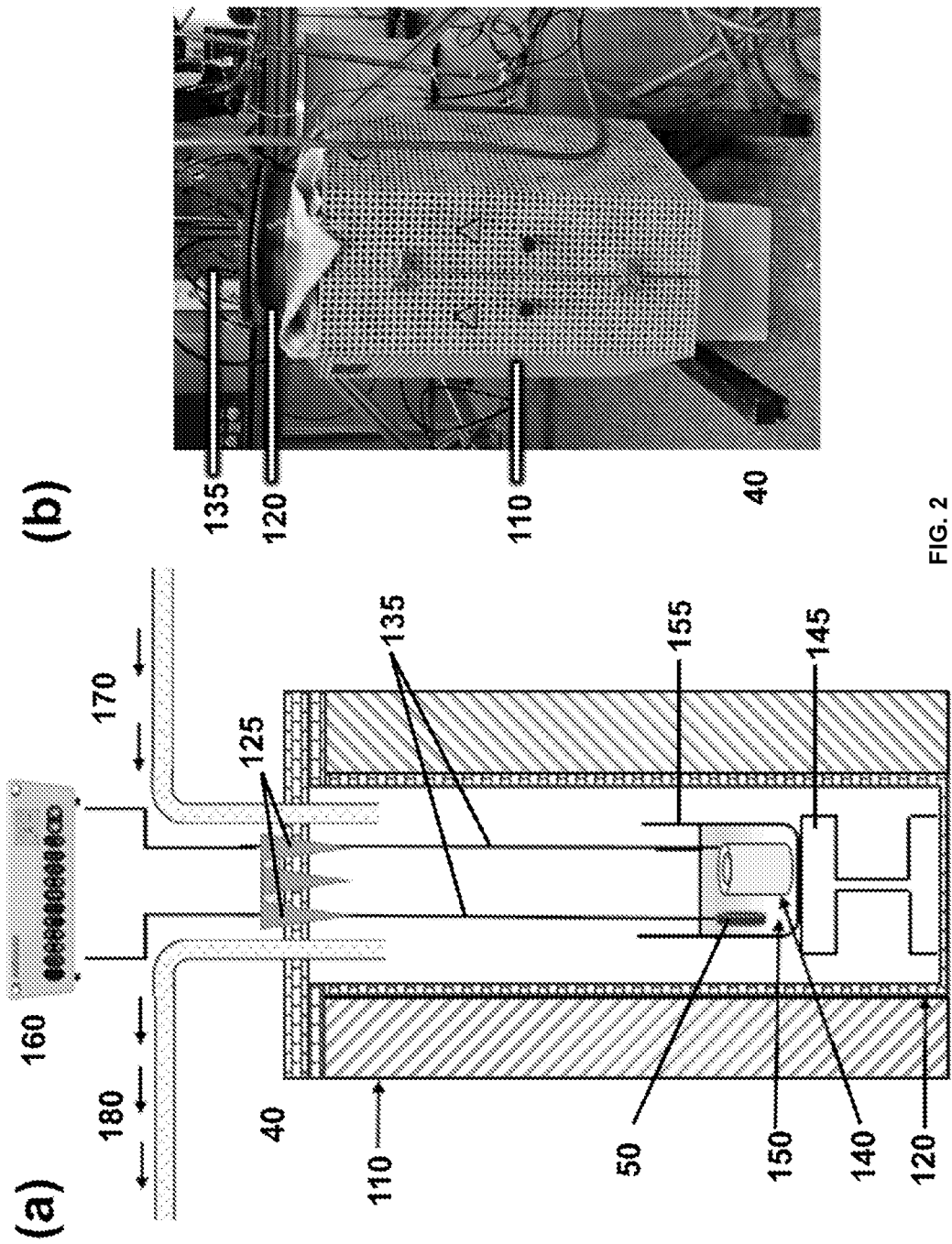

A detailed setup of the electrolytic cell 40 is shown in FIG. 2a, and a photograph of the outer view of the cell 40 is shown in FIG. 2b.

Anhydrous calcium chloride (>97% purity) was dried at 120° C. in vacuum oven for 24 hours to ensure the moisture is fully removed. Thereafter, approximately 250 to 350 g of calcium chloride was weighed and placed in the crucible 155, supported by the crucible holder 145 in the reactor chamber 120

A graphite crucible 140 (counter electrode, anode) and the wrapped petroleum coke pellet 50 (working electrode, cathode—from general method 1) were tied to two separate stainless-steel rods 135 on the reactor chamber cover. The electrodes 140 and 50 may be supported by silicon bungs 125 at the top to elevate them to a suitable height.

A cover was placed over the reactor chamber and properly sealed and fastened. At this stage, the two electrodes were left hanging (supported by silicon bungs 125) in the reactor chamber 120 above the solid $CaCl_2$.

An argon gas flow was with an outlet pressure of approximately 0.2 barg was directed into the reaction chamber via gas inlet 170, and out of the chamber via gas outlet 180. A continuous flow of the argon gas was ensured by observing the bubbles are produced in the Drescher bottle (not shown).

The $CaCl_2$ salt was then heated at 850° C. to fully liquefy into molten salt 150. Once the $CaCl_2$ salt was melted, the temperature of the molten salt was checked and determined to be at 850° C. Thereafter, both working electrode 50 (petroleum coke pellet) and counter electrode 140 (graphite) were immersed into the molten $CaCl_2$) salt 150 as shown in FIG. 2a. The cell was connected to a potentiostat 160, and the voltage was set at 2.6 V with an electrolysis time of 90 minutes.

As will be appreciated, the electrolysis conditions can be varied accordingly. For example, the cell voltage may be in the range of 2.2 to 3.0 V, and the temperature set at between 700° C. to 900° C. with electrolysis time of 60 to 120 minutes. Further, other molten inorganic salts may be used, which include alkaline earth halides (other than $CaCl_2$)), or a combination of alkaline earth and alkaline halides (e.g. $CaBr_2$, $MgCl_2$, $MgBr_2$, $BaCl_2$, $BaBr_2$, KCl, KBr, NaCl, NaBr, LiCl and LiBr).

After the completion of the electrolysis process, the electrodes were removed from the molten salt and were allowed to cool under the argon flow. After cooling, the as-obtained graphene pellet (previously the petroleum coke pellet 50) was washed several times with distilled water, or with dilute HCl (0.1 M) and with water again. The graphene pellet was dried in a vacuum oven at 80° C. for 24 hours to give a yield of about 80-85%

The graphene pellet synthesised from the coke pellet 30a (13 mm in diameter with ~3 mm thickness) is denoted as "graphene (small)", while the graphene synthesised from the coke pellet 30b (32 mm in diameter with a thickness of 3.60 mm) is denoted as "graphene (large)" in the examples and figures.

The proposed mechanism for the conversion of petroleum coke to graphene involves two steps. First, it involves the removal of oxygen from the petroleum coke via an electro-reduction process. The presence of oxygen atoms in amorphous carbon will hinder the graphitisation process. The second step is the long-distance rearrangement of carbon atoms to form large, perfect graphene sheets, which can be stacked into a graphite structure.

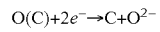  (Equation 1)

Example 2. Characterisation of the Graphene Synthesised from the Method of the Current Invention The graphene pellets as-synthesised from Example 1 were characterised by Raman spectroscopy, transmission electron microscopy (TEM), X-ray diffraction (XRD), CHNS elemental analysis and X-ray photoelectron spectroscopy (XPS) analyses.

Raman Spectroscopy

Figure 3:
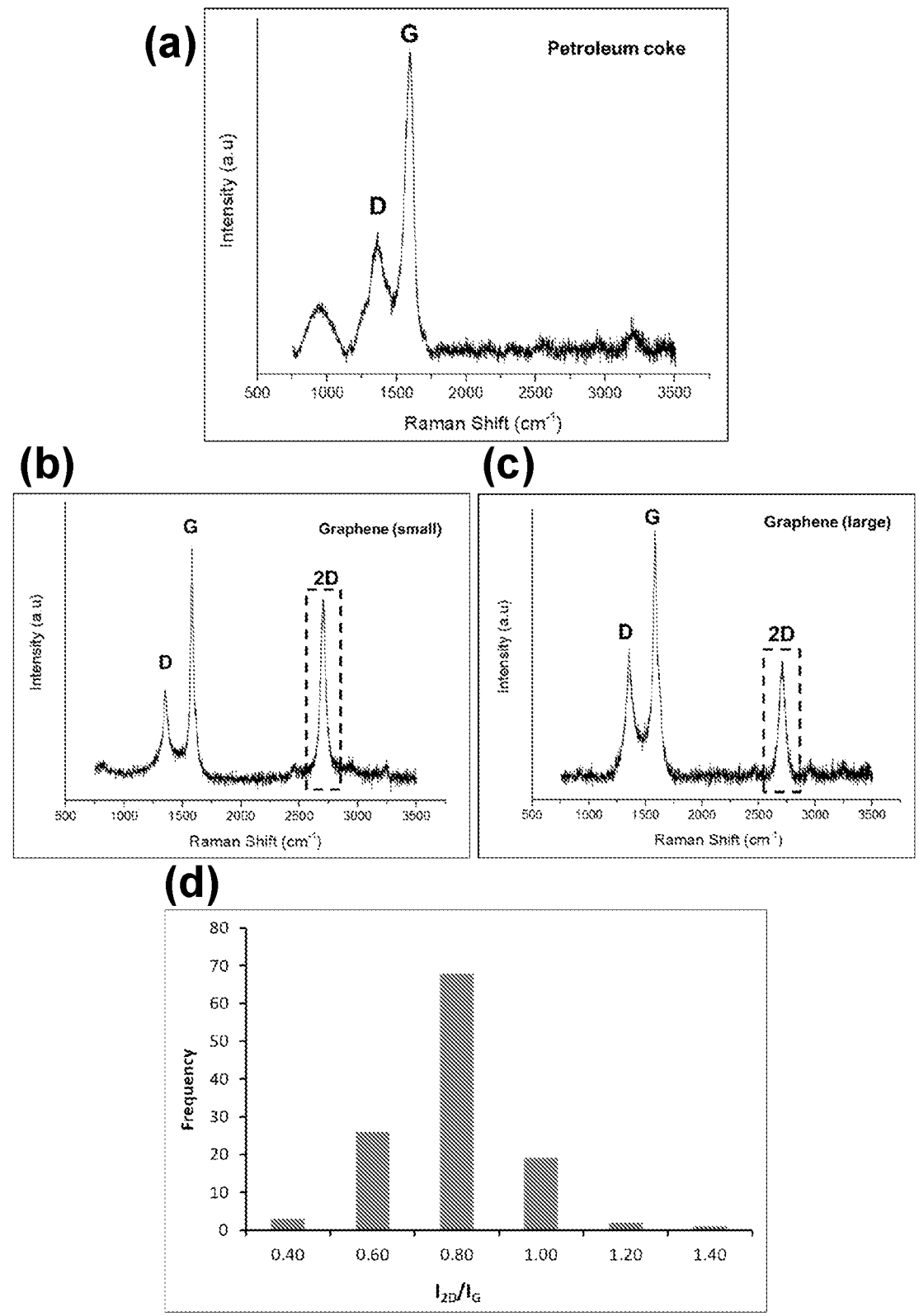
FIG. 3 Depicts the Raman spectra of: (a) petroleum coke; (b) as-synthesised graphene (small); (c) as-synthesised graphene (large); and a distribution of the ratio of the 2D-band intensity over that of the G-band in the as-synthesised graphene.

The Raman spectrum of the petroleum coke in FIG. 3a shows the D-band and G-band at around 1350 $cm^{-1}$ and 1583 $cm^{-1}$, respectively. However, a 2D-band was not observed in the Raman spectrum of raw petroleum coke. After electrolysis, the Raman spectra of the converted electrodes (in FIGS. 3b and c) show an intense 2D-band at around 2700 $cm^{-1}$, which suggests the successful formation of petroleum coke to graphene materials.

Raman mapping of around 120 point on the as-synthesised graphene show that the composition has a few layers of graphene (less than 5 layers, with more that 70% having 5 layers), as determined from the $I_{2D}/I_G$ ratio. Typically, an $I_{2D}/I_G$ ratio of 2-3 indicates a monolayer graphene, while an $I_{2D}/I_G$ ratio of between 1 to 2 indicates a bilayer graphene, and an $I_{2D}/I_G$ ratio of less than 1 corresponds to a multilayer graphene. From FIG. 3d, about 90 out of 120 points are in the range of >0.8, which therefore suggests that the as-synthesised graphene sample has less than 5 layers.

With few layers of graphene, the thickness of the sample was determined to be approximately 1 to 3 nm.

Transmission Electron Microscopy (TEM)

Figure 4:
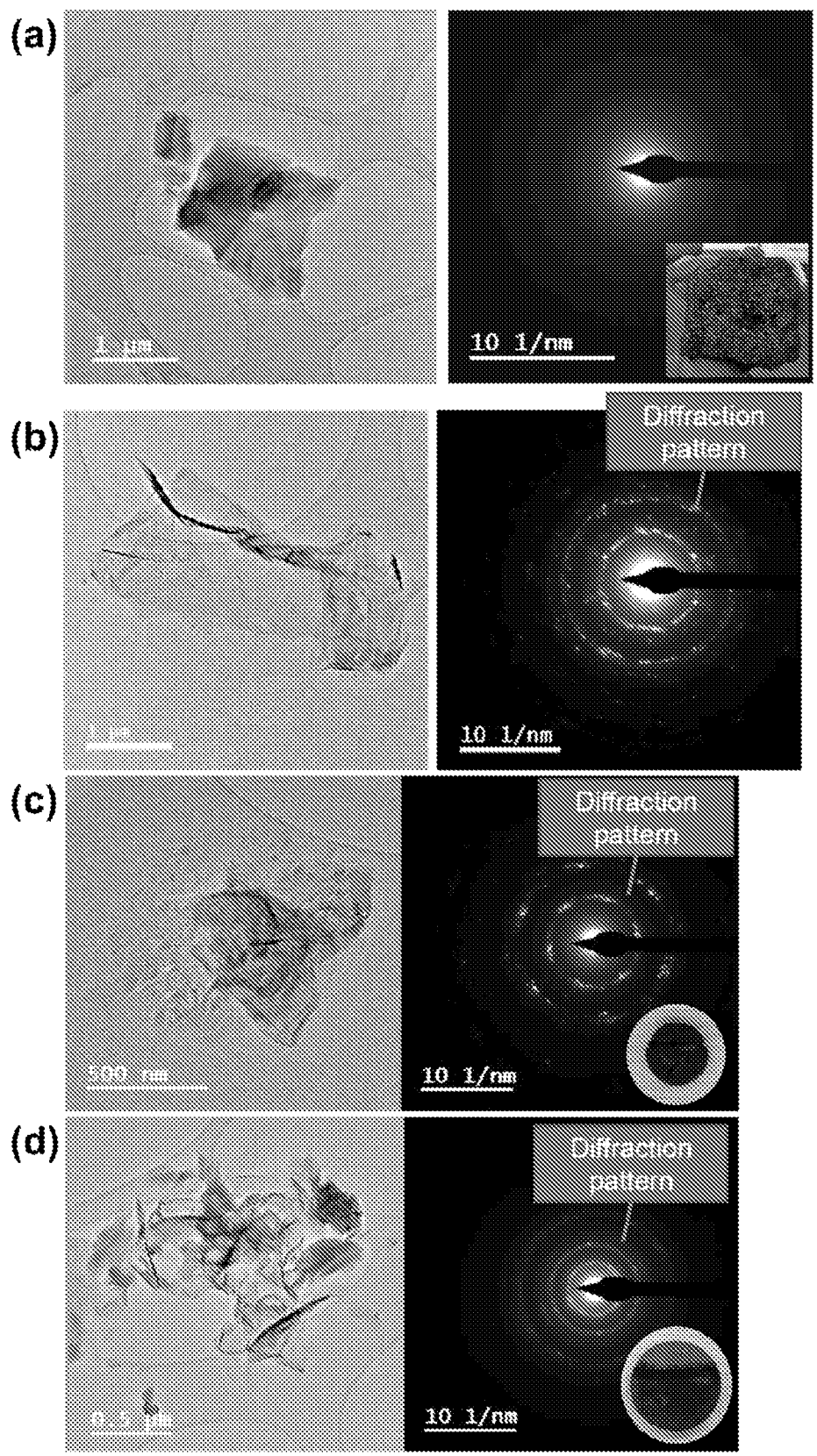
FIG. 4 Depicts the TEM images and diffraction patterns of: (a) petroleum coke; (b) a commercial sample of graphene; (c) as-synthesised graphene (small); and (d) as-synthesised graphene (large).

The TEM images of the as-synthesised graphene cathodes (FIGS. 4c and d) show thin morphologies that are absent in the petroleum coke sample (FIG. 4a), but appear similar to a commercial graphene sample (FIG. 4b). Further, the as-synthesised graphene cathodes show clear diffraction patterns (absent in petroleum coke, but present in the commercial graphene sample) which confirms the conversion of coke to graphene.

The lateral size of the as-synthesised graphene was determined to be around 500 to 1000 nm as shown in the TEM images.

X-Ray Diffraction (XRD)

Figure 5:
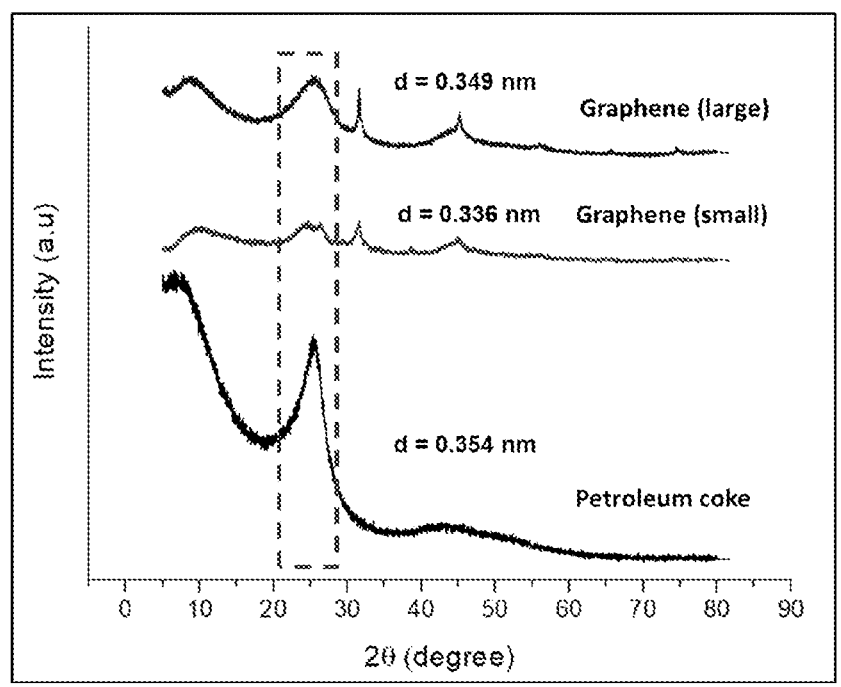
FIG. 5 Depicts the XRD spectra of the as-synthesised graphene material in comparison to that of petroleum coke.

The diffraction peaks at $2\theta=\sim 25°$ for both as-synthesised graphene samples (small and large) exhibit comparable diffraction pattern with the d-spacing value lower than that of petroleum coke (FIG. 5). This finding indicates that the amorphous petroleum coke was successfully converted to a highly organised carbon structure or graphitic structure.

CHNS Elemental and X-Ray Photoelectron Spectroscopy (XPS) Analysis

The petroleum coke obtained from the refinery shows a substantial amount of sulfur content (Tables 1 and 2). After electrochemical conversion to graphene, it was observed that the sulfur content was reduced as compared to petroleum coke (Table 2).

TABLE 1

Composition and property of petroleum coke

| Component | Value |
| --- | --- |
| Ash content (%) | 0.15-0.30 |
| Hardgrove Grindability Index (HGI) | 95-112 |
| Moisture content (%) | 4.7-7.0 |
| Sulfur content (%) | 4.5-6.0 |
| Volatile organic matter (%) | 14.0-17.0 |

TABLE 2

CHNS elemental analysis of the as-synthesised graphene samples as compared to petroleum coke

| Sample | C | H | N | S |
| --- | --- | --- | --- | --- |
| Petroleum coke | 86.87 | 4.14 | 1.50 | 6.58 |
| Graphene (small) | 73.51 | 0.39 | 1.93 | 2.51 |
| Graphene (large) | 84.31 | 0.73 | 1.27 | 4.70 |

Figure 6:
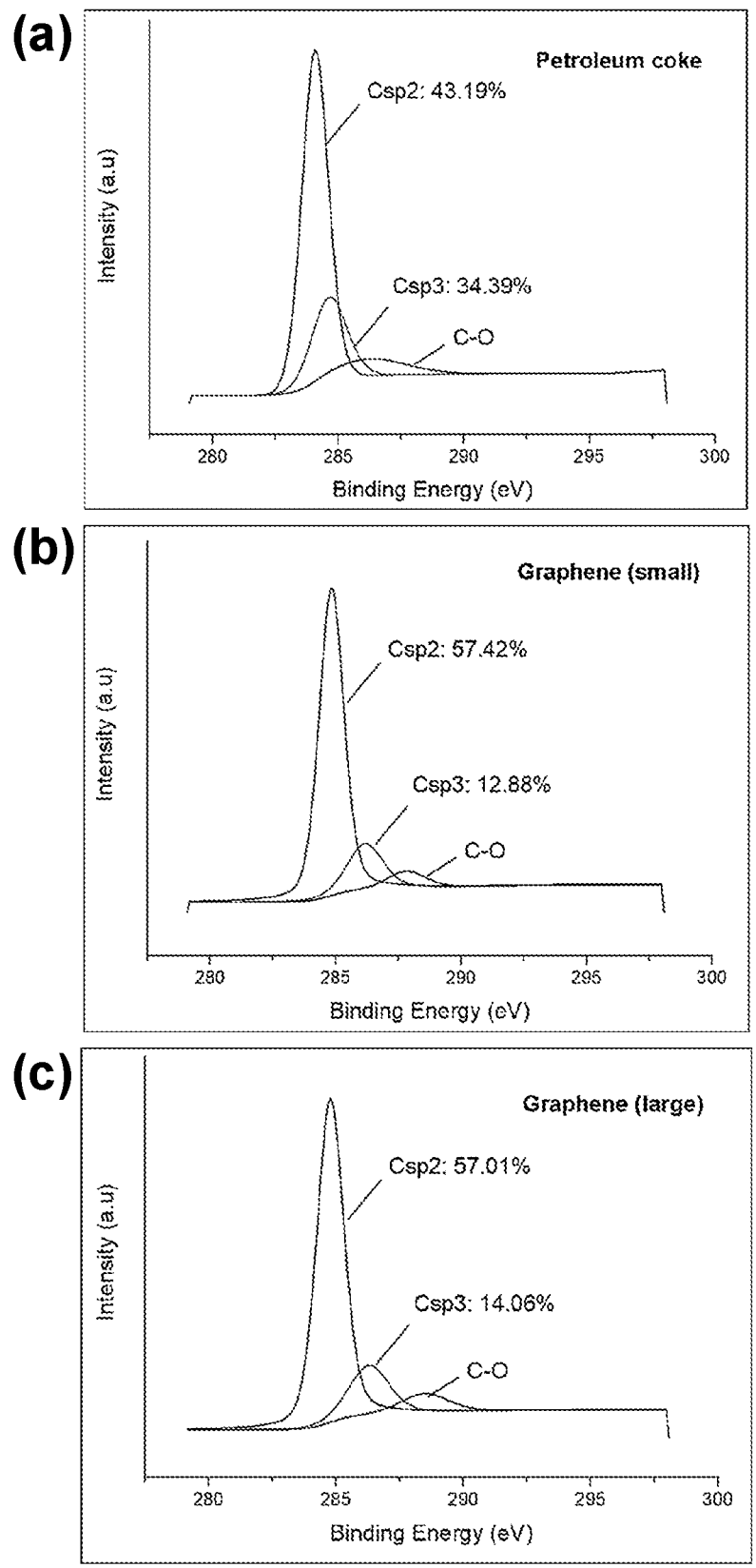
FIG. 6 Depicts the XPS spectra of: (a) petroleum coke; (b) as-synthesised graphene (small); and (c) as-synthesised graphene (large).

The XPS spectra showed an increase in the binding energy due to C=C ($C_{sp2}$) and a substantial decrease in the C—C ($C_{sp3}$) peak (Table 3, FIGS. 6a-c). This clearly suggests the conversion of petroleum coke to graphene, which has a higher proportion of C=C bonds.

TABLE 3

XPS analysis of the as-synthesised graphene samples as compared to petroleum coke.

| Sample | C | O | C/O ratio | $C_{sp2}$ | $C_{sp3}$ |
| --- | --- | --- | --- | --- | --- |
| Petroleum coke | 93.00 | 2.72 | 34.19 | 43.19 | 34.39 |
| Graphene (small) | 79.32 | 4.70 | 7.63 | 57.42 | 12.88 |
| Graphene (large) | 88.35 | 6.44 | 13.72 | 57.01 | 14.06 |

The invention claimed is:

1. A method of converting a carbon material to graphene, the method comprising the step of subjecting an amorphous carbon material pellet submerged in a molten inorganic material that comprises an alkaline earth halide to an electrochemical reaction in an inert atmosphere for a period of time, wherein the amorphous carbon material pellet is converted to a graphene pellet comprising graphene flakes by said reaction.

2. The method according to claim 1, wherein the pellet is broken up to provide individual and/or aggregates of graphene flakes.

3. The method according to claim 2, wherein the graphene flakes display one or more of the following properties:
 (a) at least 70% of the graphene flakes have a thickness of five layers of less;
 (b) the thickness of the graphene flakes is from 0.3 to 3 nm;
 (c) the lateral size of the graphene flakes is from 500 to 1000 nm.

4. The method according to claim 1 wherein the molten inorganic material is maintained in a molten state at a temperature of from 700 to 900° C.

5. The method according to claim 4, wherein the molten inorganic material is maintained in a molten state at a temperature of 850° C.

6. The method according to claim 1, wherein the alkaline earth halide has formula I:

$$MX_2 \qquad\qquad I$$

where M is selected from Ca, Mg and Ba and
X is selected from Cl or Br.

7. The method according to claim 6, wherein the alkaline earth halide is $CaCl_2$.

8. The method according to claim 1, wherein the molten inorganic material consists essentially of an alkaline earth halide.

9. The method according to claim 1, wherein the molten inorganic material further comprises an alkali halide of formula II:

$$NX$$

where N is K, Na or Li; and
X is Cl or Br.

10. The method according to claim 9, wherein, when present, the molar ratio of the alkali halide to the alkaline earth halide is from 0.1:1 to 1:0.1.

11. The method according to claim 1, wherein the electrochemical reaction is conducted using a voltage of from 2.2 to 3.0 V.

12. The method according to claim 1, wherein the period of time is from 60 to 120 minutes.

13. The method according to claim 1, wherein the amorphous carbon is selected from one or more of the group consisting of biomass, coal, activated carbon, coke, and carbon black.

14. The method according to claim 13, wherein the amorphous carbon is petroleum coke.

15. The method according to claim 1, wherein the amorphous carbon is provided as a pellet formed by the compression of amorphous carbon particles having an average particle size of from 50 to 100 μm in size.

16. The method according to claim 1, wherein the inert atmosphere is argon.

17. The method according to claim 1, wherein the amorphous carbon forms a cathode used in the electrochemical reaction.

18. The method according to claim 17, wherein the cathode is attached to a current collector, optionally wherein the current collector is formed from one or more of a molybdenum mesh, a molybdenum wire and a nickel foam.

19. The method according to claim 17, where an anode is provided as a counter electrode to the cathode.

20. The method according to claim 19, wherein the anode is formed from graphite.

* * * * *

UNITED STATES PATENT AND TRADEMARK OFFICE
CERTIFICATE OF CORRECTION

PATENT NO. : 12,000,055 B2
APPLICATION NO. : 18/021906
DATED : June 4, 2024
INVENTOR(S) : Ahmad et al.

It is certified that error appears in the above-identified patent and that said Letters Patent is hereby corrected as shown below:

In the Specification

In Column 2, Line 6, delete "claim" and insert --clause--.
In Column 2, Line 9, delete "claim" and insert --clause--.
In Column 2, Line 18, delete "claims" and insert --clauses--.
In Column 2, Line 20, delete "claim" and insert --clause--.
In Column 2, Line 24, delete "claims" and insert --clauses--.
In Column 2, Line 29, delete "claim" and insert --clause--.
In Column 2, Line 32, delete "claims" and insert --clauses--.
In Column 2, Line 34, delete "claims" and insert --clauses--.
In Column 2, Line 42, delete "claim" and insert --clause--.
In Column 2, Line 46, delete "claims" and insert --clauses--.
In Column 2, Line 49, delete "claims" and insert --clauses--.
In Column 2, Line 52, delete "claims" and insert --clauses--.
In Column 2, Line 55, delete "claim" and insert --clause--.
In Column 2, Line 58, delete "claims" and insert --clauses--.
In Column 2, Line 62, delete "claims" and insert --clauses--.
In Column 2, Line 64, delete "claims" and insert --clauses--.
In Column 2, Line 66, delete "claim" and insert --clause--.

In Column 3, Line 3, delete "claim" and insert --clause-- in both instances.
In Column 3, Line 5, delete "claim" and insert --clause--.

In the Claims

In Claim 3, Column 10, Line 4, delete "of" and insert --or--.

Signed and Sealed this
Twentieth Day of August, 2024

Katherine Kelly Vidal
*Director of the United States Patent and Trademark Office*